United States Patent [19]
Wood et al.

[11] Patent Number: 5,535,122
[45] Date of Patent: Jul. 9, 1996

[54] METHOD OF AND AN APPARATUS FOR PROVIDING A SAFETY CHECK OF THE BRAKE RETARDATION CAPABILITY OF A BRAKE SYSTEM ON A VEHICLE

[75] Inventors: James A. Wood, Spartanburg; David A. Greer, Simpsonville; Richard J. Mazur, Greer, all of S.C.

[73] Assignee: Westinghouse Air Brake Company, Wilmerding, Pa.

[21] Appl. No.: 219,778

[22] Filed: Mar. 30, 1994

[51] Int. Cl.$^6$ .............................. B60T 8/88; G06F 7/70
[52] U.S. Cl. ............................ 364/426.01; 364/426.05; 303/122
[58] Field of Search .................. 364/426.01, 426.02, 364/426.05, 431.07; 303/92, 93, 95, 100, 104, 107; 180/197

[56] References Cited

U.S. PATENT DOCUMENTS

| | | | |
|---|---|---|---|
| 4,485,444 | 11/1984 | Maruyama et al. | 364/426.01 |
| 4,735,463 | 4/1988 | Rhoton et al. | 303/16 |
| 4,744,607 | 5/1988 | Nagata | 303/3 |
| 4,867,288 | 9/1989 | Simonyi et al. | 192/1.23 |
| 4,999,779 | 3/1991 | Wood et al. | 364/426.03 |
| 5,290,095 | 3/1994 | Wood et al. | 303/92 |

*Primary Examiner*—Kevin J. Teska
*Assistant Examiner*—Tan Q. Nguyen
*Attorney, Agent, or Firm*—James O. Ray, Jr.

[57] ABSTRACT

Method of providing brake retardation capability safety check. Method includes generating a signal representing vehicle mass, and combining it with an electric brake feedback signal and a brake cylinder pressure signal to generate a signal representing vehicle deceleration rate. Integrating the signal representing vehicle acceleration rate to generate an output signal representative of a process cycle speed reduction value. Inputting and storing values of process cycle speed reduction output signals to and in, respectively, a summation unit. Adding such values inputted to summation unit to a predetermined number of seconds worth of process cycle speed reduction values and generating output signal representative of braking effort available in terms of speed reduction over such predetermined number of seconds. Inputting brake command signal to brake command jerk limiting unit. Adding a delay value to brake command signal and jerk limiting brake command signal to provide output signal having a value equal to deceleration rate request value. Inputting deceleration rate request output signal to minimum capability level determination unit and generating output signal representative of minimum acceptable braking capability level in terms of speed reduction over predetermined number of seconds and comparing braking effort available to minimum acceptable braking capability level and determine whether minimum required safe braking level has been achieved.

19 Claims, 1 Drawing Sheet

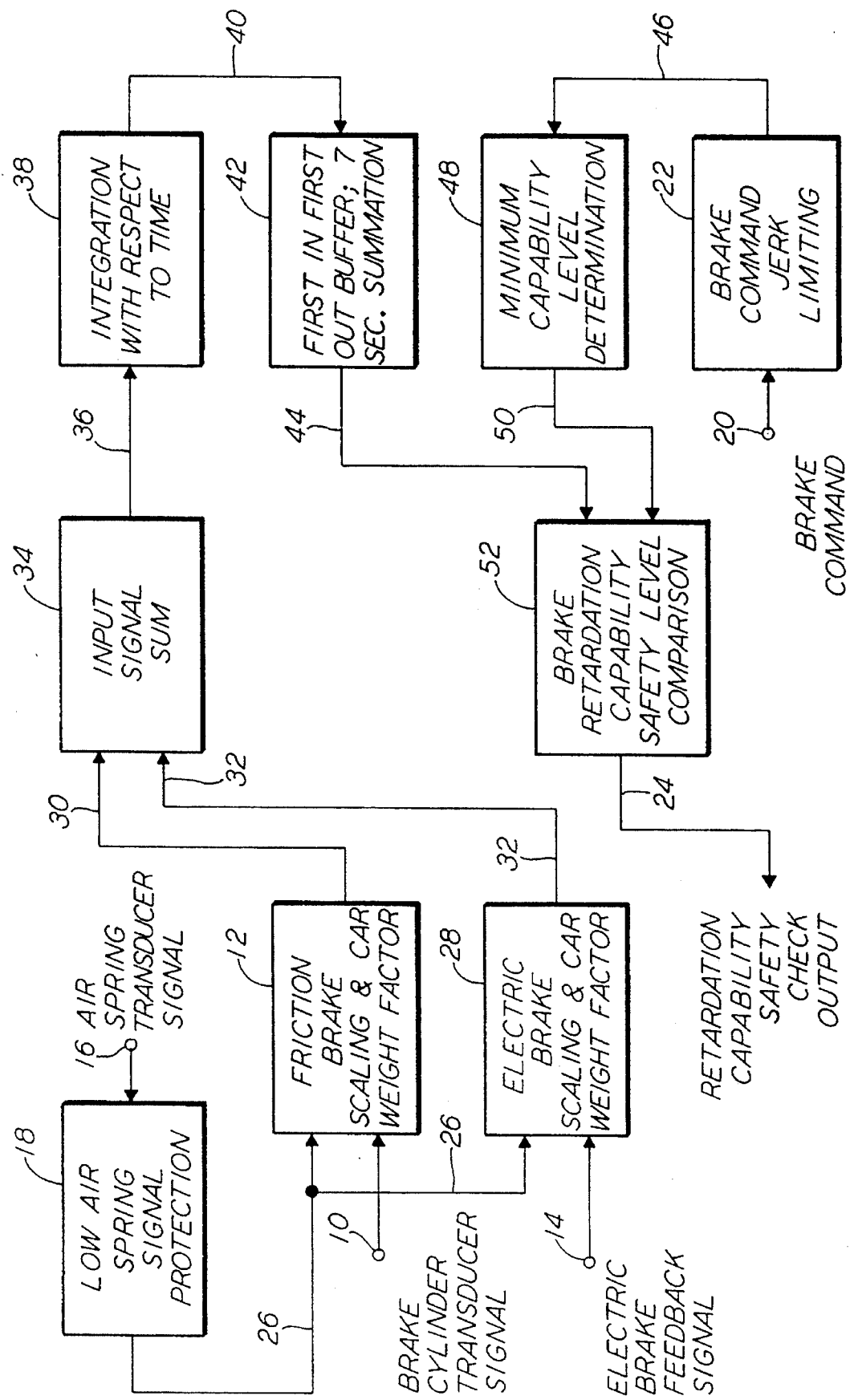

METHOD OF AND AN APPARATUS FOR PROVIDING A SAFETY CHECK OF THE BRAKE RETARDATION CAPABILITY OF A BRAKE SYSTEM ON A VEHICLE

FIELD OF THE INVENTION

The present invention relates, in general, to rather commonly used multi-mode friction type brake systems which are disposed on each truck portion of a subway type transit vehicle and/or a light rail type transit vehicle and, more specifically, this invention relates to both a method of and an apparatus for providing a readily obtainable safety check signal which is representative of the actual brake retardation capability of such multi-mode friction brake systems during operation of such vehicle.

BACKGROUND OF THE INVENTION

As is well known in the art, prior to the present invention, single point control of a multi-mode type friction brake system used on each truck portion of a mass transit subway vehicle or on a light rail vehicle has now become a reality in the passenger transit industry. However, with the one force modulation devices now being used and a single control signal which can operate each of the blended service braking, the emergency braking and the wheel slip control, the previously used classic wheel slip safety timer has generally been rendered more or less ineffective as a suitable control device to ensure that the minimum safe brake retardation is being provided by the vehicle braking system. This is especially the situation when conditions are encountered by the transit vehicle such that wheel slip control activity is taking place.

In some of the passenger transit systems in use today, which applicants are aware of, a relatively simple pressure level/timer form of feedback is used as a more reliable control scheme in lieu of the above mentioned safety timers.

One of the more significant disadvantages of these prior art multi-mode friction brake control systems is that they were usually not compatible with all of the different types of braking systems currently being used in the passenger transit industry. The currently used braking systems include, for example, hydraulic, pneumatic or electric brake control systems. Furthermore, the currently used control systems may be, for example, either the digital or analog type.

Furthermore, it is generally well known that many of todays most modern passenger transit systems use an advanced adhesion adaptive wheel slip control system. These advanced control systems normally require that a combination of wheel slip control safety processes be carried out.

For friction brake control arrangements, where a single device is used to provide the blended service brake, the emergency brake and the wheel slip control for its respective truck portion, a safety timer approach has a number of rather serious limitations. In particular, the combination of service/emergency brake control and wheel slip control into a single control device creates rather severe command signal problems, particularly, with respect to the prioritization of these signals. The main reason why this is such a severe problem is because wheel slip control, by its very nature, wants to try to reduce the braking force being applied to a level which is below the commanded levels sufficient to control wheel slippage.

Additionally, when both a separate wheel slip control valve device and a brake control valve device are utilized, the wheel slip control valve device normally wants to remain in a wide open application state when the slippage is not being controlled. On the other hand, the brake control valve device cannot remain in a wide open application state at any time during a normal operation mode. Consequently, the combining of both brake control and wheel slip control into a single operating valve device substantially eliminates simple control command feedback as a viable safety check for brake retardation capability. In fact, it becomes almost impossible task for even the most advanced safety timer processes, available at the present time, to determine whether a control action being taken is either a legitimate brake control action, a legitimate wheel slip control action, or an equipment fault condition that exists.

SUMMARY OF THE INVENTION

In a first aspect, the present invention provides an apparatus for providing a brake retardation capability safety check system for a passenger transit vehicle. Such apparatus includes a first means disposed on such vehicle for determining a mass of such vehicle and for generating a first output signal having a numerical value representative of such vehicle's mass. There is a second means disposed on such vehicle which is connected to receive both such first output signal and a brake cylinder pressure signal for converting both such first output signal and such brake cylinder pressure signal into a friction brake deceleration rate. This second means further generates a second output signal having a numerical value representative of such friction brake deceleration rate. Additionally, a third means is disposed on such vehicle and is connected to receive both such first output signal and an electric brake feedback signal for converting such first output signal and such electric brake feedback signal into an electric brake deceleration rate. Such third means generates a third output signal having a numerical value representative of such electric brake deceleration rate. A fourth means is disposed on such vehicle which is connected to receive such second output signal and such third output signal for summing the numerical values together and for generating a fourth output signal having a numerical value representative of a vehicle deceleration rate. The apparatus further includes a fifth means disposed on such vehicle which is connected to receive such fourth output signal for integrating this fourth output signal with respect to time and for generating a fifth output signal having a numerical value representative of a predetermined process cycle speed reduction value. A sixth means is disposed on such vehicle that is connected to receive the fifth output signal for storing numerical values of a predetermined plurality of fifth output signals and for adding a last numerical value of a last fifth output signal to a predetermined number of seconds worth of such process cycle speed reduction values and generating a sixth output signal having a numerical value representative of braking effort available in terms of speed reduction over such predetermined number of seconds. A seventh means is disposed on such vehicle which is connected to receive a brake command signal for adding a delay value to such brake command signal and for jerk limiting this brake command signal prior to generating a seventh output signal which has a numerical value representative of a deceleration rate request value. There is an eighth means disposed on such vehicle which is connected to receive this seventh output signal for determining a minimum braking capability level and for generating an eighth output signal having a numerical value representative of a minimum acceptable braking capability level in terms of speed reduction of such predetermined number of seconds. Finally, there is a ninth means disposed on such vehicle and connected to receive both the sixth output signal and the eighth output signal for comparing such braking effort available to the minimum acceptable braking capability level and determine if a minimum required safe braking level has been achieved. Such ninth means generates a ninth output signal representative of a brake retardation capability safety check.

According to a second aspect of the present invention, there is provided a method of providing a brake retardation capability safety check system for a passenger transit vehicle. This method includes the steps of determining a mass value of such transit vehicle and then generating a first output signal representative of the vehicle mass. Thereafter, inputting the first output signal generated and a brake cylinder pressure signal to a unit which is capable of converting this first output signal and the brake cylinder pressure signal to a friction brake deceleration rate and then generating a second output signal having a numerical value representative of the friction brake deceleration rate. Inputting such first output signal generated and an electric brake feedback signal to a unit capable of converting such first output signal and the feedback signal to an electric brake deceleration rate and then generating a third output signal having a numerical value which is representative of such electric brake deceleration rate. Inputting such numerical value of such second output signal generated and such numerical value of the third output signal generated to a summation unit. Adding together in this summation unit such numerical values and then generating a fourth output signal having a numerical value representative of a vehicle deceleration rate. Thereafter, inputting such numerical value of the fourth output signal generated to an integration unit. Performing an integration thereof with respect to time and generating a fifth output signal having a numerical value representative of a process cycle speed reduction value. Next, inputting and storing such numerical value of such fifth output signal generated to and in, respectively, a summation unit. Adding such numerical value of the fifth output signal inputted into such summation unit to the last predetermined number of seconds worth of process cycle speed reduction values and generating a sixth output signal having a numerical value which is representative of braking effort available in terms of speed reduction over such last predetermined number of seconds. Also during the process it is important to input a brake command signal to a brake command jerk limiting unit and then add a delay value to such brake command signal before jerk limiting the brake command signal to provide a seventh output signal having a numerical value equal to a deceleration rate request value. Then, inputting such seventh output signal generated to a minimum capability level determination unit and generating an eighth output signal having a numerical value which is representative of minimum acceptable braking capability level in terms of speed reduction over the last predetermined number of seconds. Finally, comparing such braking effort available to such minimum acceptable braking capability level and determine if a minimum required safe braking level has been achieved.

OBJECTS OF THE INVENTION

It is, therefore, one of the primary objects of the present invention to provide a method of and an apparatus for providing a safety check of brake retardation on various types of friction brake control systems disposed on various passenger transit vehicles.

Another object of the present invention is to provide a method and apparatus in which brake force feedback is used to confirm that a predetermined minimum safe brake retardation is being achieved in a passenger transit vehicle.

Still another object of the present invention is to provide a method of and an apparatus for providing a safety check of brake retardation on a passenger transit vehicle in which the brake control can be analog or digital in device output and/or input command signal.

Yet another object of the present invention is to provide an apparatus for providing a safety check of brake retardation on a passenger transit vehicle as well as providing the same level of protection to the brake control.

A further object of the present invention is to provide a method of providing a safety check of brake retardation on a passenger transit vehicle as well as providing the same level of protection to the wheel slip control.

Still yet another object of the present invention is to provide a method of and an apparatus for providing a safety check of brake retardation on a passenger vehicle which can be used for brake control only systems and for classical type separate brake control device/wheel slip control device systems.

Yet still another object of the present invention is to provide a method of providing a safety check of brake retardation which can be readily implemented through the use of either discrete electrical circuits or microprocessor type applications.

In addition to the various objects and advantages of the present invention which have been described above various other objects and advantages of the invention will become more readily apparent to those persons who are skilled in the brake control art for passenger transit vehicles from the following more detailed description of the invention, particularly, when such description is taken in conjunction with the attached drawing FIGURE and the appended claims.

BRIEF DESCRIPTION OF THE DRAWING

The FIGURE is a schematic diagram of a presently preferred embodiment of the invention as it is used on a pneumatic brake system disposed on a passenger transit vehicle.

BRIEF DESCRIPTION OF A PRESENTLY PREFERRED EMBODIMENT OF THE INVENTION

Prior to proceeding to the more detailed description of the invention it should be noted that although the invention will be described as a system that utilizes an analog type pneumatic friction brake force control signal, a pneumatic brake cylinder pressure feedback signal, an air spring pressure signal to determine the weight of the vehicle and a tractive effort type electric brake feedback signal, it is to be understood that other force control signals and/or force feedback signals can be just as readily used by persons skilled in the art of passenger transit vehicle braking.

As used hereinafter in the description of the invention the term "device" may be either a discrete electrical circuit or as a portion of a microprocessor.

The present invention utilizes a number of process input signals to achieve effective safety checks of the brake retardation capability of a given vehicle. One of these process input signals is a brake cylinder pressure signal 10. Brake cylinder pressure signal 10 is generated and transmitted to a friction brake scaling and car weight factoring device 12 by an air pressure to voltage level transducer (not shown) which provides the brake cylinder pressure. As is well known in the art the brake cylinder pressure is converted to brake shoe force by either a disc brake unit or a tread brake unit. By specific knowledge of the brake particular brake unit conversion factor and the coefficient of friction of the specific brake shoes the actual brake retardation force can be obtained.

Another one of these process input signals is an electric brake feedback signal 14. The electric brake feedback signal 14 is provided to the friction brake control by the propulsion control unit (not shown). Signal 14 is indicative of the actual retardation force provided by the traction motors at the time they are reversed and used to provide vehicle braking.

The process input signals, according to the invention, further include an air spring transducer signal 16. Signal 16 is generated and transmitted by an air pressure to voltage level transducer (not shown) to a low air spring signal protection device 18. The signal 16 is used to determine the pressure in the air bag suspension of the vehicle and thereby provide an indication of the vehicle load status which enables the vehicle weight to be determined.

Still another one of the process input signals is a brake command signal 20 which is transmitted to a brake command jerk limiting device 22. Brake command signal 20 is indicative of the requested brake rate level (MPHPS) which the respective trucks brake control must provide. As used in this invention, the brake command signal 20 is the vehicle trainline signal after it has been converted and scaled for use in the friction brake control logic, but before it has been jerk limited.

According to the present invention, there is a single process output signal. Such single output signal is the brake retardation capability safety check output signal 24. The signal 24 is a digital signal that is provided to the brake and wheel slip control logic (not shown) and used by such control logic to inform it of a brake retardation capability problem. How this brake retardation capability safety check signal 24 is used, for example, calling for full application, set/reset of a timed fault control function, providing an indication, etc. is determined by the specifics of the particular system.

Now refer more particularly to the FIGURE. As illustrated therein, the air spring transducer signal 16 is transmitted to the low air spring signal protection device 18 where it is used to determine the pressure in the air bag suspension (not shown) of the transit vehicle and thus provide an indication of the vehicle load status and thereby determine the vehicle weight. Within the low air spring signal protection device 18 the air spring transducer signal 16 is compared to an upper limit and to a lower limit. If the signal 16 is out of the appropriate range low air spring signal protection device 18 will set the signal to a default value, for example, either the light car value, heavy car value, or some value in between the light car value and heavy car value. The device 18 scales the input (or default) value such that it represents the vehicle mass and provides an output signal 26 which is transmitted to the friction brake scaling and car weight factor device 12 and to the electric brake scaling and car weight factor device 28. For example, if the input to the low air spring signal protection device 18, as represented by air spring transducer signal 16, is less than 40 PSIG the output signal 26 will be representative of the light vehicle mass of 2250 (LBF*SEC2)/FT. On the other hand, if the input to the low air spring signal protection device 18 is greater than 69 PSIG the output signal 26** will be representative of the heavy vehicle mass of 3125 (LBF*SEC2)/FT. Finally, if the air spring transducer signal 16 input to the air spring protection device 18 is representative of an air spring pressure equal to or between 40 PSIG and 69 PSIG, the output signal 26 sent from the device 18** will be equal to the following equation:

$$Output = 30.17 * Air\ Spring\ Pressure + 1043.1\ [Output\ In\ (LBF*SEC**2)/FT]$$

The friction brake scaling and car weight factor device 12 receives as one input the output signal 26, which is representative of the vehicle mass, from the low air spring signal protection device 18. Another input to the friction brake scaling and weight factor device 12 is the brake cylinder transducer signal 10, which is representative of the brake cylinder pressure. The device 12 takes the brake cylinder transducer signal 10 and based on the value of the output signal 26 converts it to an equivalent friction brake deceleration rate value as an output signal 30. For any given process cycle, the output value of output signal 30 will be the numerical value of the retardation rate (MPHPS) that the present level of friction brake force can provide. The numerical value of output signal 30 is determined according to the following equation:

$$Output = (BCP * 129.5)/VM\ [Output\ In\ MPHPS],\ wherein\ VM = Vehicle\ Mass\ [In\ (LBF*SEC2)/FT],\ and\ BCP = Brake\ Cylinder\ Pressure\ [In\ LBF/IN2].$$

According to one of the presently preferred embodiments of the instant invention, the electric brake scaling and car weight factor device 28 receives as inputs thereto the output signal 26 from the low air spring signal protection device 18 and the electric brake feedback signal 14 which provides device 28 the actual retardation force being provided by the traction motors whenever they reversed and thereby used to provide vehicle braking. The electric brake feedback signal 10 is converted in device 28, based on the vehicle mass, to an equivalent electric brake deceleration rate value. Such electric brake deceleration rate value is provided as an output signal 32 by the device 28. For any given process cycle, the output value of output signal 32 will be the numerical value of the retardation rate (MPHPS) that the present level of electric brake force can provide. Output signal 32 is determined according to the following equation:

$$Output = (EBV * -1758.6)/VM\ [Output\ In\ MPHPS],\ wherein\ VM = Vehicle\ Mass\ [In\ (LBF*SEC**2)/FT],\ and\ EBV = Electric\ Brake\ Voltage\ [In\ VDC;\ the\ voltage\ is\ negative]$$

Each of the output signals 30 and 32 are sent to an input signal summation device 34 where they are added together and then provided as an output signal 36 from summation device 34. The numerical value of output signal 36 is representative of the total braking level on the vehicle in terms of deceleration rate at any particular point in time.

The output signal 36 is sent to an integration device 38 where it is integrated with respect to time. Such integration device 38 performs a simple numerical integration on the total vehicle braking level. This is accomplished by simply multiplying the numerical value of output signal 36 by the process cycle time step. The resulting numerical value, which is provided as an output signal 40, is in terms of speed reduction over the time step. It is to be noted that this function is performed, not because speed reduction is necessarily desired, but that further along in the process the total braking level will be averaged over a time period and this integration is a necessary first step. The numerical value of output signal 40 is equal to the value of output signal 36 times 0.02 seconds (the process cycle or time step). For any given process cycle, the numerical value of output signal 40 will, also, be representative of the speed reduction (MPH) on the vehicle that the brake force was capable of providing during the last process cycle.

A first in first out buffer device 42 is provided. Such first in first out buffer device 42 receives as an input thereto the output signal 40 from the integration device 38 and is responsible for averaging the total vehicle braking level over a predetermined time period. For the purposes of this description of the invention seven seconds will be used for the predetermined time period. It is to be understood, however, that any other reasonable time period which is capable of substantially smoothing out the wheel slip control force modulation induced spikes could be used equally as well and the present invention is not to be limited either to or by the actual example presently being described. First in first out buffer device 42 stores seven seconds worth of inputs of the output signal 40 from the integration device 38. Buffer device 42 stores one input for each process cycle. Further, each cycle the value put in buffer device 42 seven seconds plus one cycle ago is thrown out, while the new input value from output signal 40 is stored therein. After the new input value is stored a summation is performed on all of the stored values in the buffer device 42. The summation of all stored values in the buffer device 42 represents the speed reduction over the last seven seconds made possible by the total braking force. The result of this summation is an output signal 44 the purpose of which will become clear as the description proceeds. At this point, it is important to note that if the summation value is divided by seven seconds, a time average deceleration rate based on the total braking force could be obtained. However, to reduce the numerical operations required this has not been done in this example. First in first out buffer device 42 includes a memory storage array to store the last seven seconds worth of input from output signal 40, therefore, for this example the array has 350 positions. Note, however, this example assumes a 0.02 second process cycle. Each time step (or process cycle) the oldest of the inputs in the array, which is located in the last position, is discarded. All of the inputs left in the array are moved forward one position, which opens up the first position in the array, at which point the input of output signal 40 for the respective time step (or process cycle) is then placed in the first position. The output signal 44 of buffer device 42 is then formed by the summation of all of the inputs present in the array.

The brake retardation capability safety check arrangement of the present invention further includes, as mentioned above, the brake command jerk limiting device 22 which receives as an input thereto the brake command signal 20 which is representative of the requested brake rate level (MPHPS) that the respective truck portions brake control must provide. In other words, this is the transit vehicle trainline signal after it has been converted and scaled for use in the friction brake logic, but before it has been jerk limited.

The primary function of this brake command jerk limiting device 22 is to take the brake command signal 20, adding a dead time thereto and jerk limiting the brake command signal 20 to provide a jerk limited output signal 46. This is the beginning phase of the production of a value useful in determining the minimum acceptable braking capability that will be compared to the actual braking output of the vehicle. Preferably, the dead time added should be about twice the design dead time for the equipment being used. Further, the jerk limit rate should preferably be set to substantially the same value that the brake control is set to for this function. In the presently preferred embodiment of the invention, the input of the brake command signal 20 to the brake command jerk limiting device 22 will generally be delayed for about 0.40 seconds. In this manner, the output signal 46 of the brake command jerk limiting device 22 will increase to the level of the input at a rate no greater than 0.04 MPHPS per time step (or process cycle). Once again, it is to be noted and understood that this example assumes a 0.02 second process cycle for illustration purposes only.

For any given process cycle, the output signal 46, which is transmitted to a minimum capability level determination device 48, will be the numerical value of the dead time and the jerk limit modified brake command level (MPHPS) for the respective vehicle truck. The minimum capability level determination device 48 produces an output signal 50 which is representative of an actual value a minimum acceptable braking capability that will be compared to the actual braking output on the vehicle. Output signal 50 in the example under discussion will be in terms of the minimum acceptable speed reduction over the last seven seconds. As was previously stated, this should theoretically be an average deceleration level, however, to reduce numerical operations and simplify the description, it is presented in terms of speed reduction over seven seconds. As the jerk limited output signal 46 increases to a level of 2.0 MPHPS, this numerical value will linearly increase from 0 to 7.7 MPH. At this point, the output signal 46 will remain constant at 7.7 MPH as the jerk limited brake command value increases. The numerical value of 7.7 MPH speed reduction over seven seconds was selected for use because it represents the maximum possible speed reduction possible on a section of rail having a 5.0 percent adhesion factor or level. This adhesion level is generally accepted in the industry as the lower limit of natural adhesion. Although this numerical value is used for illustration purposes only and is arbitrary in nature as far as the operation of the invented process is concerned, it does represent an example of the thought process that one skilled in the art would follow to select this value. For all brake command signal 20 input values which are less than or equal to 2.0 MPHPS, the output signal 46 from the brake command jerk limiting device 22 will be equal to 3.85 times the numerical input value of brake command signal 20 (i.e., Output=3.85 * Input). On the other hand, for all input values of the brake command signal 20 which are greater than 2.0 MPHPS the value of output signal 46 from the brake command jerk limiting device 22 will equal 7.7 MPHPS. It is to be noted, however, that the numerical value of output signal 46 will not be less than 0.0.

According to one of the presently preferred embodiments of the invention there is, also, provided a brake retardation capability safety level comparison device 52. Received as inputs thereto are the output signal 44, from the first in first out buffer device 42, the numerical value of which is representative of the braking forces speed reduction capability (MPH) over the last seven seconds of operation of the vehicle and the output signal 50, from the minimum capability level determination device 48, the numerical value of which is representative of the minimum acceptable speed reduction capability also over the last seven seconds of vehicle operation. This minimum capability level determination device 48 serves the function of comparing the total braking level on the vehicle in terms the speed reduction that occurred over the last seven seconds to the value representing the minimum acceptable braking capability likewise in terms of speed reduction over the last seven seconds. A relatively high output signal 24 value from the device 48 will generally signify an acceptable braking level, while a rather low output signal 24 value will be indicative of an unacceptable braking level. If the numerical input value of output signal 44 to the brake retardation capability safety level comparison device 52 is greater than or equal to the input value of output signal 50 to device 52 the output signal 24 will be a logical "1" (i.e., braking is above or equal to the minimum acceptable capability). On the other hand, if the numerical input value of output signal 44 is less than the input value of output signal 50 to the device 52, the output signal 24 of device 52 will be a logical "0" (i.e., braking is below the minimum acceptable capability).

It should be noted that the output signal 24 of brake retardation safety level 52 is a simple digital signal which can be made readily available for use by other control processes disposed on a transit vehicle. By leaving the output signal 24 of device 52 in terms of a simple digital signal, this process can be used, for example, in cooperation with timers, set/reset functions, fault handling/annunciation procedures and other safety checks, as the over all system design of the transit vehicle may dictate.

While a number of presently preferred embodiments of the invention have been described in detail above with reference to the FIGURE, it should be understood that various other modifications and adaptations of the present invention may be made by persons who are skilled in the transit art without departing from the spirit and scope of the appended claims.

We claim:

1. A method of providing a brake retardation capability safety check system for a passenger transit vehicle, said method comprising the steps of:

(a) determining a mass of said transit vehicle and generating a first output signal representative of said vehicle mass;

(b) inputting said first output signal generated in step (a) and a brake cylinder pressure signal to a unit capable of converting said first output signal and said brake cylinder pressure signal to a friction brake deceleration rate and generating a second output signal having a numerical value representative of said friction brake deceleration rate;

(c) inputting said first output signal generated in step (a) and an electric brake feedback signal to a unit capable of converting said first output signal and said feedback signal to an electric brake deceleration rate and generating a third output signal having a numerical value representative of said electric brake deceleration rate;

(d) inputting said numerical value of said second output signal generated in step (b) and said numerical value of said third output signal generated in step (c) to a first summation unit;

(e) adding said numerical values together and generating a fourth output signal having a numerical value representative of a vehicle deceleration rate;

(f) inputting said numerical value of said fourth output signal generated in step (e) to an integration unit;

(g) performing an integration thereof with respect to time and generating a fifth output signal having a numerical value representative of a process cycle speed reduction value;

(h) inputting and storing said numerical value of said fifth output signal generated in step (g) to and in, respectively, a second summation unit;

(i) adding said numerical value of said fifth output signal inputted into said second summation unit in step (h) to last predetermined number of seconds worth of process cycle speed reduction values and generating a sixth output signal having a numerical value representative of braking effort available in terms of speed reduction over said last predetermined number of seconds;

(j) inputting a brake command signal to a brake command jerk limiting unit;

(k) adding a delay value to said brake command signal and jerk limiting said brake command signal to provide a seventh output signal having a numerical value equal to a deceleration rate request value;

(l) inputting said seventh output signal generated in step (k) to a minimum capability level determination unit and generating an eighth output signal having a numerical value representative of minimum acceptable braking capability level in terms of speed reduction over said last predetermined number of seconds; and (m) comparing said braking level available to said minimum acceptable braking capability level and generating a signal representative of a brake retardation capability safety check.

2. A method of providing a brake retardation capability safety check system for a passenger transit vehicle, according to claim 1, wherein step (a) includes inputting an air spring pressure signal derived from an air spring transducer into a low air spring signal protection device.

3. A method of providing a brake retardation capability safety check system for a passenger transit vehicle, according to claim 2, wherein step (a) includes the step of substituting a default vehicle mass value when said air spring pressure signal is outside a predetermined minimum and a predetermined maximum range.

4. A method of providing a brake retardation capability safety check system for a passenger transit vehicle, according to claim 3, wherein said predetermined minimum air spring pressure is about 40.0 PSIG.

5. A method of providing a brake retardation capability safety check system for a passenger transit vehicle, according to claim 3, wherein said predetermined maximum air spring pressure is about 69.0 PSIG.

6. A method of providing a brake retardation capability safety check system for a passenger transit vehicle, according to claim 1, wherein said method is operable with each of hydraulic brake systems, pneumatic brake systems, electric brake systems and various combinations of these brake systems.

7. A method of providing a brake retardation capability safety check system for a passenger transit vehicle, according to claim 1, wherein said method is operable using at least one of analog signals and digital signals.

8. A method of providing a brake retardation capability safety check system for a passenger transit vehicle, according to claim 1, wherein said numerical value of said second output signal is determined by the following equation:

$$Output = (BCP * 129.5)/VM \ [Output \ In \ PMHPS], \ wherein \ VM=Vehicle \ Mass \ [In \ (LBF*SEC2)/FT] \ and \ BCP=Brake \ Cylinder \ Pressure \ [In \ LBF/IN2].$$

9. A method of providing a brake retardation capability safety check system for a passenger transit vehicle, according to claim 8, wherein said numerical value of said third output signal is determined by the following equation:

$$Output=(EBV * -1758.6)/VM \text{ [Output In MPHPS], wherein}$$
$$VM=\text{Vehicle Mass [In } (LBF*SEC**2)/FT] EBV= \text{ Electric Brake Voltage [In VDC; The voltage is negative]}.$$

10. A method of providing a brake retardation capability safety check system for a passenger transit vehicle, according to claim 9, wherein said delay value added to said brake command signal in step (k) is about 0.40 seconds.

11. A method of providing a brake retardation capability safety check system for a passenger transit vehicle, according to claim 1, wherein step (h) includes the additional step of removing the oldest stored numerical value from such second summation unit when inputting said numerical value of said fifth output signal.

12. A method of providing a brake retardation capability safety check system for a passenger transit vehicle, according to claim 1, wherein said output signal representative of said vehicle retardation capability can be utilized in other vehicle control functions.

13. A method of providing a brake retardation capability safety check system for a passenger transit vehicle, according to claim 12, wherein said other vehicle control functions are selected from the group consisting of timers, set/reset functions, fault handling/annunciation procedures and safety checks.

14. An apparatus for providing a brake retardation capability safety check system for a passenger transit vehicle, said apparatus comprising:

(a) a first means disposed on such vehicle for determining a mass of such vehicle and for generating a first output signal having a numerical value representative of said mass;

(b) a second means disposed on such vehicle and connected to receive said first output signal and a brake cylinder pressure signal for converting said first output signal and said brake cylinder pressure signal into a friction brake deceleration rate and for generating a second output signal having a numerical value representative of said friction brake deceleration rate;

(c) a third means disposed on such vehicle and connected to receive said first output signal and an electric brake feedback signal for converting said first output signal and said electric brake feedback signal into an electric brake deceleration rate and for generating a third output signal having a numerical value representative of said electric brake deceleration rate;

(d) a fourth means disposed on such vehicle and connected to receive said second output signal and said third output signal for summing the numerical values together and for generating a fourth output signal having a numerical value representative of a vehicle deceleration rate;

(e) a fifth means disposed on such vehicle and connected to receive said fourth output signal for integrating said fourth output signal with respect to time and for generating a fifth output signal having a numerical value representative of a predetermined process cycle speed reduction value;

(f) a sixth means disposed on such vehicle and connected to receive said fifth output signal for storing numerical values of a predetermined plurality of fifth output signals and for adding a last numerical value of a last fifth output signal to a predetermined number of seconds worth of said process cycle speed reduction values and generating a sixth output signal having a numerical value representative of braking effort available in terms of speed reduction over said predetermined number of seconds;

(g) a seventh means disposed on such vehicle connected to receive a brake command signal for adding a delay value to said brake command signal and for jerk limiting said brake command signal prior to generating a seventh output signal having a numerical value representative of a deceleration rate request value;

(h) an eighth means disposed on such vehicle and connected to receive said seventh output signal for determining a minimum braking capability level and for generating an eighth output signal having a numerical value representative of a minimum acceptable braking capability level in terms of speed reduction of said predetermined number of seconds; and (i) a ninth means disposed on such vehicle and connected to receive said sixth output signal and said eighth output signal for comparing said braking effort available to said minimum acceptable braking capability level and determine if a minimum required safe braking level has been achieved and for generating a ninth output signal representative of a brake retardation capability safety check.

15. An apparatus for providing a brake retardation capability safety check system for a passenger transit vehicle, according to claim 14, wherein said first means includes an air spring transducer for providing an air spring pressure signal.

16. An apparatus for providing a brake retardation capability safety check system for a passenger transit vehicle, according to claim 14, wherein each of said first means, said second means, said third means, said fourth means, said fifth means, said sixth means, said seventh means, said eighth means and said ninth means are discrete electrical circuits.

17. An apparatus for providing a brake retardation capability safety check system for a passenger transit vehicle, according to claim 14, wherein each of said first means, said second means, said third means, said fourth means, said fifth means, said sixth means, said seventh means, said eighth means and said ninth means are part of a microprocessor.

18. An apparatus for providing a brake retardation capability safety check system for a passenger transit vehicle, according to claim 14, wherein said apparatus is operable with each of hydraulic brake systems, pneumatic brake systems, electric brake systems and various combinations of these brake systems.

19. An apparatus for providing a brake retardation capability safety check system for a passenger transit vehicle, according to claim 14, wherein said apparatus is operable with at least one of analog signals and digital signals.

* * * * *

UNITED STATES PATENT AND TRADEMARK OFFICE
CERTIFICATE OF CORRECTION

PATENT NO. : 5,535,122
DATED : July 9, 1996
INVENTOR(S) : James A. Wood, et al.

It is certified that error appears in the above-indentified patent and that said Letters Patent is hereby corrected as shown below:

Column 10,
 Claim 8, line 5, delete "PMHPS" and insert --MPHPS--.

Signed and Sealed this

Sixth Day of January, 1998

Attest:

BRUCE LEHMAN

Attesting Officer

Commissioner of Patents and Trademarks